US007918470B2

(12) United States Patent
Matsuzaki et al.

(10) Patent No.: US 7,918,470 B2
(45) Date of Patent: Apr. 5, 2011

(54) HYDRAULIC SUSPENSION SYSTEM

(75) Inventors: Akihiro Matsuzaki, Sakai (JP); Atsushi Hayashi, Nara (JP); Toshimitsu Yazaki, Sakai (JP); Kenichi Iwami, Sakai (JP)

(73) Assignee: Kubota Corporation, Osaka (JP)

( * ) Notice: Subject to any disclaimer, the term of this patent is extended or adjusted under 35 U.S.C. 154(b) by 67 days.

(21) Appl. No.: 12/372,911

(22) Filed: Feb. 18, 2009

(65) Prior Publication Data
US 2009/0212473 A1 Aug. 27, 2009

(30) Foreign Application Priority Data

Feb. 25, 2008 (JP) ................. 2008-042995

(51) Int. Cl.
*B60G 9/04* (2006.01)
(52) U.S. Cl. .............................. 280/124.157
(58) Field of Classification Search ........... 280/124.157, 280/124.158, 124.159, 124.16, 6.151, 6.152, 280/6.153, 6.157, 6.159
See application file for complete search history.

(56) References Cited

U.S. PATENT DOCUMENTS

2006/0108185 A1* 5/2006 Bitter ................. 188/151 R
2009/0020975 A1 1/2009 Iwami et al.

FOREIGN PATENT DOCUMENTS

| CN | 2707546 Y | 7/2005 |
| EP | 0761481 A2 | 3/1997 |

* cited by examiner

*Primary Examiner* — Faye M. Fleming
(74) *Attorney, Agent, or Firm* — The Webb Law Firm

(57) ABSTRACT

A hydraulic suspension system includes a suspension base (16) supporting wheels, a hydraulic cylinder (19) for displaceably suspending the suspension base from a vehicle body, and an oil passage connected to the hydraulic cylinder. An accumulator (21, 23) is incorporated within the oil passage. A flow control valve (51) is incorporated at an oil passage portion between the hydraulic cylinder and said accumulator for controlling an amount of work oil flowing therebetween. A pressure sensor (56) is provided for detecting a cylinder oil passage pressure effective on the hydraulic cylinder. A control unit (57) is provided for controlling operation of the flow control valve, based upon a detection value from the pressure sensor.

7 Claims, 6 Drawing Sheets

HYDRAULIC SUSPENSION SYSTEM

BACKGROUND OF THE INVENTION

1. Field of the Invention

The present invention relates to a hydraulic suspension system including a suspension base supporting wheels, and a hydraulic cylinder for displaceably suspending the suspension base from a vehicle frame.

2. Description of the Related Art

European Patent Application Publication EP 0761481A2 discloses a work vehicle suspension system including a front axle frame supporting right and left front wheels, a support bracket supported to a vehicle frame to be vertically pivotable about a right/left axis, and a traveling suspension provided between the vehicle frame and the support bracket. With this suspension system, a vertically elongate bracket (suspension base) supporting an axle is mounted to be pivotable about a right/left axis of of a pivot shaft, and a hydraulic cylinder is provided between a front end of this vertically elongate bracket and a vehicle body frame.

Further, Japanese patent Application No. 2007-189612 filed by the present applicant on Jul. 20, 2007 discloses a hydraulic suspension system wherein a pair of right and left front wheels mounted to right and left opposed ends of a front axle case are suspended via a hydraulic suspension from a vehicle body frame.

With this suspension system, because of its structure, when there occurs a change in the load (sprung load of the suspension) applied to the front portion of the vehicle body as a result of attachment/detachment of an implement or variation in the work load, there occurs a change in the spring constant of the suspension in proportion to that load change. On the other hand, if the flow amount of work oil flowing between the hydraulic cylinder and an accumulator is constant, the damping coefficient of the suspension is constant. Therefore, if there occurs increase in the front load of the vehicle body due to e.g. attachment of an implement or increase in the work load and there occurs increase in the spring constant of the suspension in proportion thereto, the damping ratio of the suspension becomes smaller relatively, which leads to corresponding decrease in the force for deadening or damping vehicle body vibration. As a result, there occurs deterioration in the riding comfort and/or in stability during vehicle run.

SUMMARY OF THE INVENTION

The object of the present invention is to provide a hydraulic suspension system cable of maintaining the damping ratio of suspension within an appropriate range regardless of change in the load applied to the vehicle body, thereby to realize comfortable and stable riding.

For accomplishing the above-noted object, a hydraulic suspension system according to the present invention comprises:

a suspension base supporting wheels;

a hydraulic cylinder for displaceably suspending said suspension base from a vehicle body;

an oil passage connected to said hydraulic cylinder;

an accumulator incorporated within said oil passage;

a flow control valve incorporated at an oil passage portion between said hydraulic cylinder and said accumulator for controlling an amount of work oil flowing therebetween;

a pressure sensor for detecting a cylinder oil passage pressure effective on said hydraulic cylinder; and a control unit for controlling operation of said flow control valve, based upon a detection value from said pressure sensor.

With the above-described characterizing construction, if there occurs increase in the load to the vehicle body (sprung load of the suspension) due to e.g. attachment of an implement or increase in the work load and there occurs increase in the spring constant of the suspension in proportion thereto, the detection (detected) value from the pressure sensor become greater in correspondence to this increased load to the vehicle body. Conversely, if there occurs decrease in the load to the vehicle body (sprung load of the suspension) due to e.g. detachment of an implement or decrease in the work load and there occurs reduction in the spring constant of the suspension in proportion thereto, the detection (detected) value from the pressure sensor become smaller in correspondence to this decreased load to the vehicle body.

For instance, the control unit will control the flow control valve in such a manner that the greater the detection value of the pressure sensor, the smaller the amount of work oil (making the work oil more difficult to flow) flowing between the hydraulic cylinder and the accumulator in correspondence with this detection value. With this, when there occurs increase in the load to the vehicle body due to attachment of an implement or increase in the work load, the damping coefficient of the suspension can be set greater in correspondence therewith. Conversely, the control unit will control the flow control valve in such a manner that the smaller the detection value of the pressure sensor, the greater the amount of work oil (making the work oil easier to flow) flowing between the hydraulic cylinder and the accumulator in correspondence with this detection value. Conversely, when there occurs decrease in the load to the vehicle body due to detachment of an implement or decrease in the work load and there occurs decrease in the spring constant of the suspension in proportion thereto, the damping coefficient of the suspension can be smaller in correspondence thereto.

Consequently, even when there occurs a change in the load to the vehicle body due to attachment/detachment of an implement or change in the work load, the damping ratio of the suspension can be kept within an appropriate range, so that the force required for damping vehicle body vibration can be maintained appropriately. With this, there are realized comfortable riding and stable running performance.

According to one preferred embodiment of the present invention, said control unit includes a threshold setting section for setting a threshold for said cylinder oil passage pressure, a determining section operable to detect a first state in which said cylinder oil passage pressure is below a set threshold and a second state in which said cylinder oil passage pressure is greater than the set threshold, and a valve controlling section operable to control said flow control valve in such a manner that in said first state, communication is established between said hydraulic cylinder and said accumulator through an orifice having a large flow passage cross section area and that in said second state, communication is established between said hydraulic cylinder and said accumulator through an orifice having a small flow passage cross section area.

With the above-described characterizing feature, if there occurs increase in the load to the vehicle body (sprung load of the suspension) due to e.g. attachment of an implement or increase in the work load and there occurs increase in the spring constant of the suspension in proportion thereto, as long as the detection value of the pressure sensor remains below the appropriate range, the flow control valve maintains the condition of communication being established between the hydraulic cylinder and the accumulator through the orifice having the large flow passage cross section area.

In case there occurs increase in the load to the vehicle body (sprung load of the suspension) due to e.g. attachment of an implement or increase in the work load and there occurs increase in the spring constant of the suspension in proportion thereto, if, the detection value of the pressure sensor exceeds the threshold, then, the flow control valve is switched over from the condition of communication being established between the hydraulic cylinder and the accumulator through the orifice having the large flow passage cross section area to the further condition of communication being established between the hydraulic cylinder and the accumulator through the orifice having the small flow passage cross section area.

Conversely, if there occurs decrease in the load to the vehicle body (sprung load of the suspension) due to e.g. detachment of an implement or decrease in the work load and there occurs reduction in the spring constant of the suspension in proportion thereto, as long as the detection value of the pressure sensor remains greater than the appropriate range, the flow control valve maintains the condition of communication being established between the hydraulic cylinder and the accumulator through the orifice having the small flow passage cross section area.

In case there occurs decrease in the load to the vehicle body (sprung load of the suspension) due to e.g. detachment of an implement or decrease in the work load and there occurs reduction in the spring constant of the suspension in proportion thereto, if the detection value of the pressure sensor falls below the threshold, then, the flow control valve is switched over from the condition of communication being established between the hydraulic cylinder and the accumulator through the orifice having the small flow passage cross section area to the further of communication being established between the hydraulic cylinder and the accumulator through the orifice having the large flow passage cross section area.

With appropriate settings of the threshold for the cylinder oil passage pressure and the flow passage cross section areas of the respective orifices so as to maintain, within the appropriate range, the damping ratio of the suspension which is obtained from the detection value of the pressure sensor (sprung load of suspension) and the spring constant of the suspension in proportion thereto in the case of the cylinder oil passage pressure being below the threshold and from the damping coefficient of the orifice having the large passage cross section area associated with this detection value below the threshold, in the case of the cylinder oil passage pressure being below the threshold and also the damping ratio of the suspension which is obtained from the detection value of the pressure sensor (sprung load of suspension) and the spring constant of the suspension in proportion thereto in the case of the cylinder oil passage pressure being greater than the threshold and from the damping coefficient of the orifice having the small passage cross section area associated with this detection value greater than the threshold, in the case of the cylinder oil passage pressure being greater than the threshold, then, even if there occurs a change in the load to the vehicle body due to attachment/detachment of an implement or change in the work load, the damping ratio of the suspension can be maintained within the appropriate range and the force required for damping the vehicle body vibration can be maintained appropriately.

The above-described construction is a technique wherein the control operation is effected with sorting the cylinder oil passage pressure into the two states of the first state and the second state. Needles, to say, the present invention is intended to encompass also such constructions where similar control is effected with sorting the cylinder oil passage pressure into a greater number of plural states. For instance, in a further embodiment involving three states, in the control unit, the determining section is operable to determine a first state of said cylinder oil passage pressure being blow the first threshold, a second state of said cylinder oil passage being greater than said first threshold and below said second threshold and also a third state of said cylinder oil passage pressure being greater than said second threshold. Further, said valve controlling section controls said flow control valve such that the communication between said hydraulic cylinder and said accumulator be established through an orifice having a large flow passage cross section area in said first state or through an orifice having an intermediate flow passage cross section area in said second state or through an orifice having a small flow passage cross section area in said third state. In this case too, said threshold setting section is capable of setting a high-level threshold and a low-level threshold lower than said high-level threshold, for each one of said first threshold and said second threshold, with setting said high-level threshold as the threshold for determining the transition from the first state to the second state and the transition from the second state to the third state and setting low-level threshold as the threshold for determining the transition from the third state to the second state and the transition from the second state to the first state.

Further, if the flow control value is constructed as a stepped-action type, the construction required for operating/controlling the flow control valve can be made simple, compared with a case of the flow control valve being constructed as a stepless type.

If the threshold used in switching from an orifice having the small flow passage cross section area to an orifice having the large flow passage cross section area is set same as the threshold used in switching in reverse from the orifice having the large flow passage cross section area to the orifice having the small flow passage cross section area, there arises the possibility of the detection value of the pressure sensor changing too frequently across this common threshold. As a result, the switchover between the orifices of different flow passage cross section areas will take place too frequently, which leads to undesired frequent and too large variation in the damping ratio of the suspension.

To overcome the above problem, according to a further preferred embodiment of the present invention, said threshold setting section has a high-level threshold and a low-level threshold lower than said high-level threshold and sets said high-level threshold as a threshold used in the determination of transition from said first state to said second state and sets said low-level threshold as a threshold used in the determination of transition from said second state to said first state.

With the above, even when the detection value of the pressure sensor changes frequently across the threshold, it is possible to avoid deterioration in the riding comfort, due to frequent switchover between the orifices of different flow passage cross section areas resulting therefrom.

According to a farther preferred embodiment of the present invention, said control unit includes a cylinder oil passage pressure calculating section for calculating a reference value obtained through a statistic calculation such as an averaging calculation, of a plurality of detection values inputted thereto from said pressure sensor within a predetermined period and then outputting said reference value as said cylinder oil passage pressure.

With the above, even when the detection value of the pressure sensor changes frequently across the threshold, as long as the statistical reference value, e.g. an average value, of the detection values calculated for each predetermined period based on the detection values inputted from the pressure sensor does not fall below the threshold value, switchover from the orifice with the small flow passage cross section area to the orifice with the large flow passage cross section area will not take place. As a result, it is possible to prevent frequent switchover between the orifices of different flow passage cross section areas.

According to a still further preferred embodiment of the present invention, there is provided a manual setter for suspension setting, and said threshold setting section changes the value of said threshold in accordance with a set value set by said manual setter.

For instance, it may be arranged such that the harder the suspension set by the setter, the lower the threshold for the cylinder oil passage pressure. This makes easer the switchover from the orifice of the flow control valve for establishing communication between the hydraulic cylinder and the accumulator from the one having the large flow passage cross section area to the one having the small flow passage cross section area and makes more difficult the switchover from the one having the small flow passage cross section area to the one having the large flow passage cross section area. Conversely, it may be arranged the softer the suspension set by the setter, the higher the threshold for the cylinder oil passage pressure. This makes more difficult the switchover from the orifice of the flow control valve for establishing communication between the hydraulic cylinder and the accumulator from the one having the large flow passage cross section area to the one having the small flow passage cross section area and makes easier the switchover from the one having the small flow passage cross section area to the one having the large flow passage cross section area.

That is to say, when the setter sets harder setting for the suspension, this makes higher the chance of using the one having the small flow passage cross section area as the orifice of the flow control valve establishing communication between the hydraulic cylinder and the accumulator, so that generally hard riding feel can be provided. Conversely, when the setter sets softer setting for the suspension, this makes higher the chance of using the one having the large flow passage cross section area as the orifice of the flow control valve establishing communication between the hydraulic cylinder and the accumulator, so that generally soft riding feel can be provided.

Further and other characterizing features and advantages of the present invention will become apparent upon reading the following detailed description of the preferred embodiments thereof with reference to the accompanying drawings.

DETAILED DESCRIPTION OF THE PREFERRED EMBODIMENTS

Next, preferred embodiments of the present invention will be described with reference to the accompanying drawings. It is understood that any one or more characterizing features of one embodiment can be used in any desired combination with one or more characterizing features of any further embodiment and that such combinations, as long as the combination not resulting in contradictions, are also encompassed within the scope of the present invention.

In the instant embodiment, a hydraulic suspension system relating to the present invention is applied to a tractor.

Figure 1:
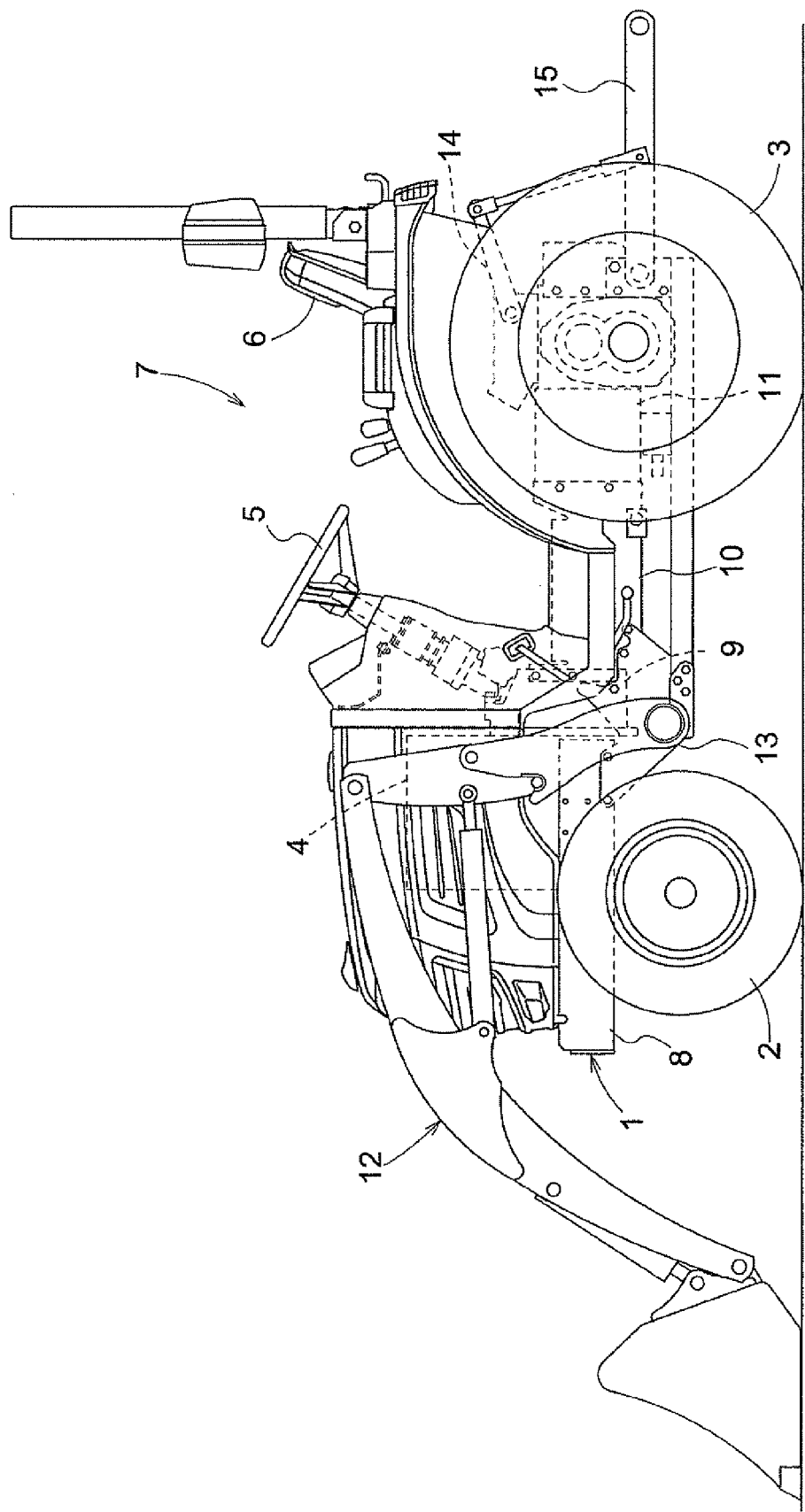
[FIG. 1] an overall side view of a tractor mounting a front loader.

FIG. 1 is an overall side view of the tractor. As shown, the tractor comprises a four-wheel drive type vehicle including a vehicle body frame 1, an engine 4 mounted on the vehicle body frame 1, and a pair of right and left front wheels 2 and a pair of right and left rear wheels 3 driven by power from the engine 4. At a rear portion of the vehicle body frame 1, there is mounted a riding driver's section 7 consisting of e.g. a steering wheel 5 for front wheel steering, a driver's seat 6, etc.

In the vehicle body frame 1, to a rear portion of a front frame 8 disposed between the right and left front wheels 2, a lower portion of the engine 4 is connected, and to a rear lower portion of the engine 4, a clutch housing 9 is connected. To a rear portion of the clutch housing 9, there is connected a transmission case (abbreviated as "T/M case" hereinafter) via an intermediate frame 10 of the vehicle body frame 1.

To the vehicle body frame 1, there is connected an auxiliary frame 13 which allows mounting of a front loader 12 as an example of a front mount type implement. In the rear portion of the T/M case 11, there are provided such components as a pair of right and left lift arms 14, a link mechanism 15, etc. which allow attachment of a rear-mount type implement such as a rotary tiller (not shown), a plow (not shown). Further, though not shown, the vehicle body frame 1 can further mount thereon e.g. a link mechanism which allows attachment of a mid-mount type implement such as a mower. To a rear portion of the T/M case, there can be mounted e.g. a link mechanism which allows attachment of a trailer, etc.

Figure 2:
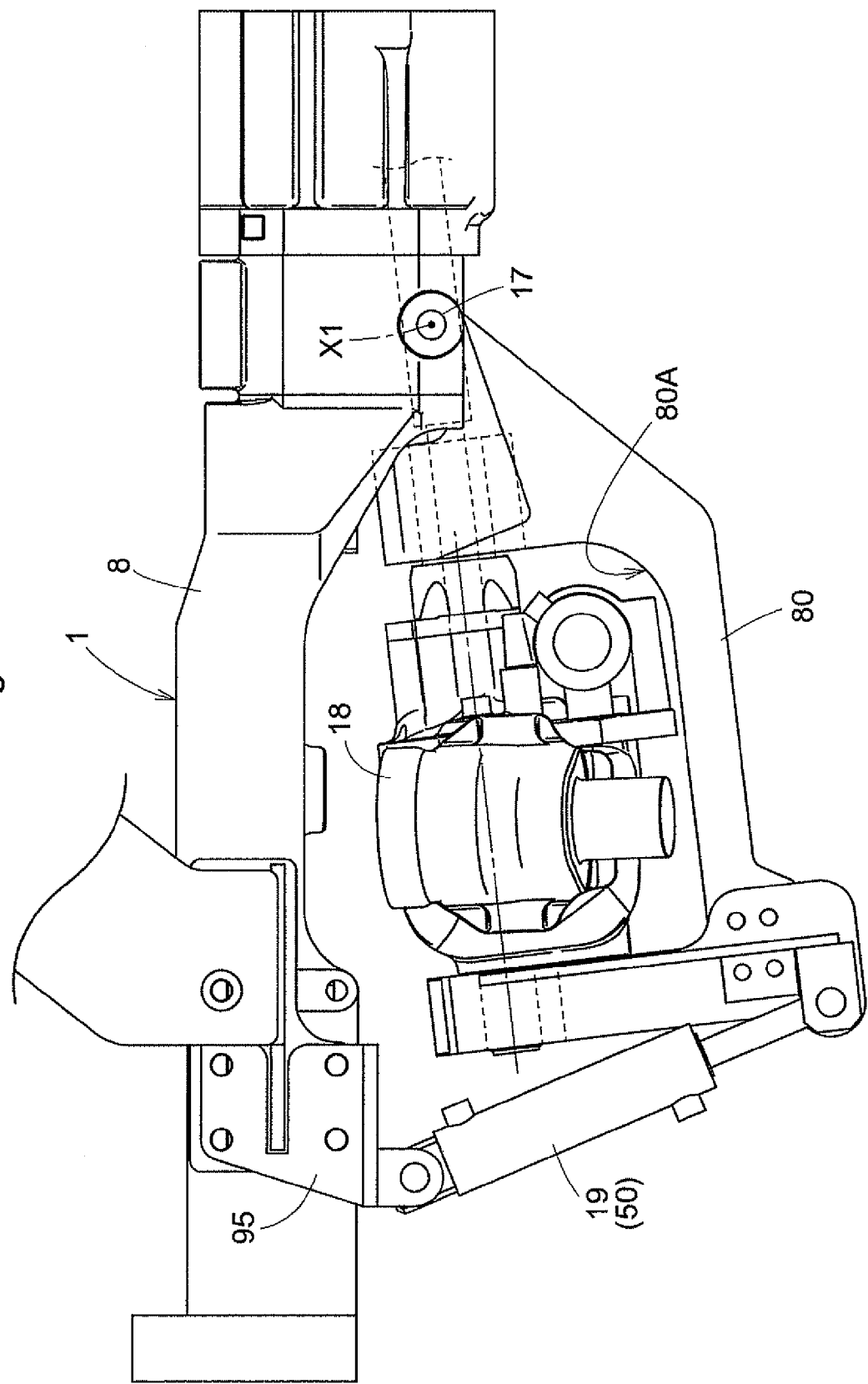
[FIG. 2] a side view of principal portions showing a support structure of a front axle case.
Figure 3:
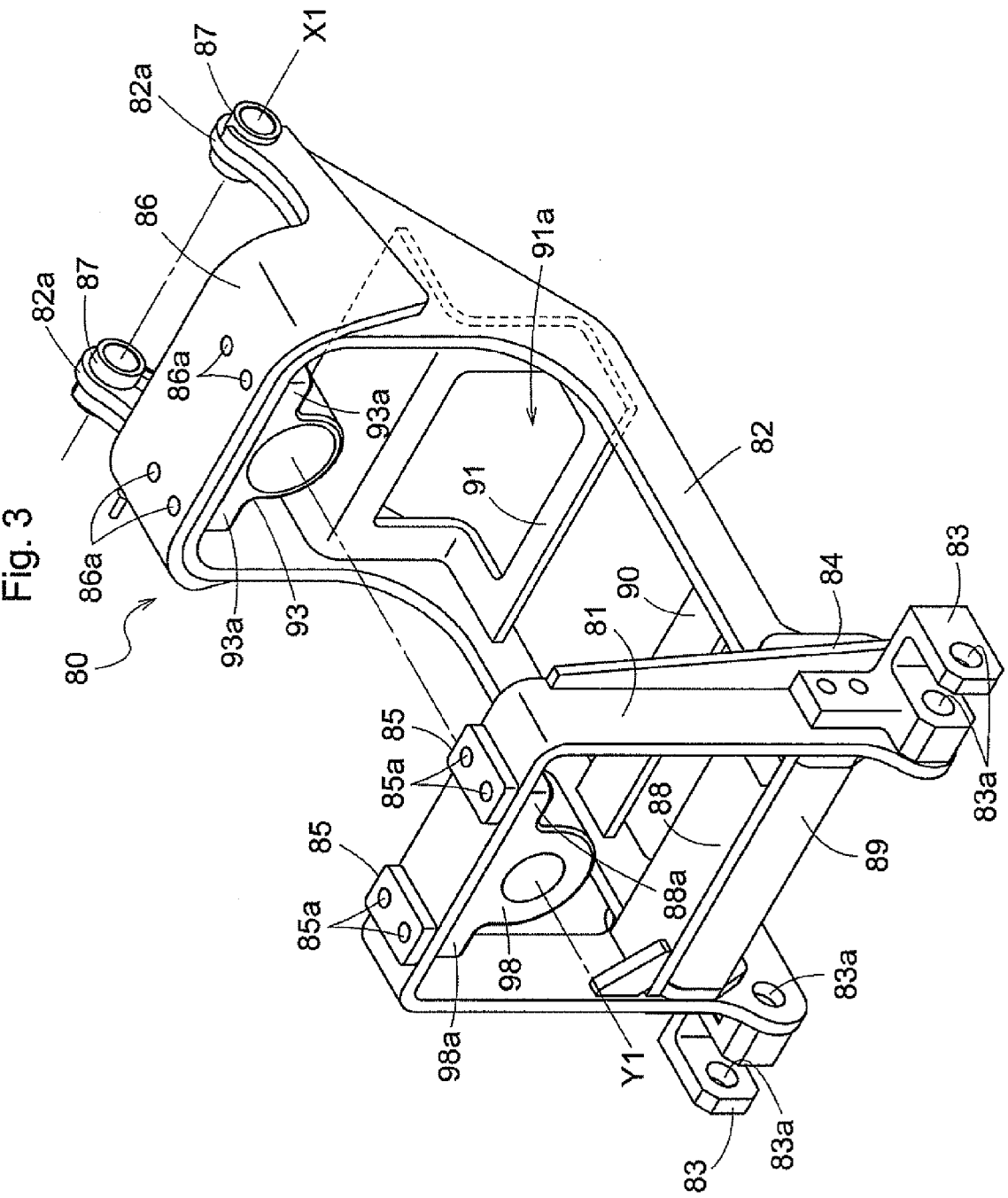
[FIG. 3] a perspective view of a suspension base.

As shown in FIG. 2, to the front frame 8, there is attached, via a right/left support shaft 17, a rear upper portion of a holder 80, as a suspension base, having a U-shape in side view as shown in FIG. 3, such that the holder 80 can be pivoted vertically about the support shaft 17. This holder 80 supports a front axle case 18 in its concave portion 80A, with allowing rolling of this front axle case 18 therein. The front end portion of the holder 80 is connected to the front frame 8 via a pair of right and left hydraulic cylinders 19. Namely, in this tractor, the right and left front wheels 2 mounted to the right and left terminal ends of the front axle case 18 are suspended, via the holder 80 and the right and left hydraulic cylinders 19, from the front frame 8 of the vehicle body frame 1.

As shown in FIG. 3, the holder 80 includes a front frame 81, a holder body 82, right and left front boss members 83, right and left front mounting seats 85, a rear reinforcing member 86 and right and left rear boss members 87.

The front frame 81 is formed by bending a plate member to obtain a lower-side opened square vertical cross sectional shape in the front view, and the right and left lower ends of the front frame 81 are secured to right and left front ends of the older body 82. The holder body 82 is formed by bending a plate member to obtain a lower-side opened vertical square cross sectional shape, and right and left lower ends of the holder body 82 extend forwardly in the form of band plates.

To the outer sides at the right and left lower ends of the front frame 81, there are fixed the right and left front boss members 83 each having a front-side opened square shape and defining through holes 83a along the right/left direction. Between and across the rear portion of this front boss member 83 and the outer side of the front frame 81, there is fixed a rib 84 having a triangular shape in the front view.

To the top face of the front frame 81, there are fixed the right and left front mounting seats 85 and a plurality of threaded portions 85a for fixing front bearing members 98 with fixing portion 98a are defined to vertically extend through the front frame 81 and the front mounting seat 85. To the top face of the holder body 82, there is fixed the plate-like reinforcing member 86 formed by bending a plate member into a shape corresponding to the shape of the upper portion of the holder body 82 and a plurality of threaded portions 86a for fixing the rear bearing members 93 with fixing portion 93a are defined to vertically extend through the holder body 82 and the rear reinforcing member 86. These front bearing member 98 and the rear bearing member 93 support an unillustrated front wheel power transmission shaft that transmits power to the transmission system in the front axle case 18.

At the rear end of the holder body 82, there are formed right and left attaching portions 82a projecting rearward, and within right/left oriented holes formed in these right and left attaching portions 82a, there are engaged and fixed right and left rear boss members 87 formed cylindrical Between and across the right and left attaching portions 82a, the reinforcing curved plate 86 is fixedly attached. This provides improvement in the strength of the rear portion of the holder body 82 with the right and left rear boss members 87 fixed thereto.

Between and across the right and left side plates of the front frame 81, there is fixed a band-plate like first reinforcing member 88. Between the right and left side plates of the holder body 82, there are fixed second through fourth reinforcing members 89, 90, 91. The fourth reinforcing member 91 fixed to the rear portion of the holder body 82 is formed by bending a plate member into a Z-shape, with an opening 91a defined at the right/left center portion thereof With this, the fourth reinforcing member 91 improves the strength of the rear portion of the holder 80, and at the same time, maintenance of e.g. the front axle case can be easily carried out by inserting a tool or the like (not shown) from the opening 91a.

As shown in FIG. 2, the right and left rear front frames 8 define, at their rear portions, a through hole extending along the right/left direction and within this hole, the rear boss member 87 of the holder 80 is supported to be vertically pivotable about a right/left axis X1. To front portions of the right and left front frames 8, there are connected right and left cylinder supporting members 95. At a pin receiving portion provided at a lower portion of each one of the right and left cylinder support members 95, a cylinder-head side end of the hydraulic cylinder 19 is supported via a pin to be pivotable about a right/left axis.

The rod-side end of the hydraulic cylinder 19 is connected via a pin to the front boss member 83 of the holder 80 to be pivotable about a right/left axis. With these, when the hydraulic cylinder 19 is extended, the holder 80 is pivoted downward about the right/left axis X1 at the rear portion of the holder 80. Whereas, when the hydraulic cylinder 190 is contracted, the holder 80 is pivoted upward about the right/left axis X1 at the rear portion of the holder 80.

Though not shown, in this tractor, the power from the engine 4 is transmitted via e.g. a main clutch housed within the clutch housing 9 to a hydrostatic stepless change-speed device (referred to as "HST" in short hereinafter) attached to the front end of the T/M case 11. Speed-changed power from the HST is transmitted from an output shaft of this HST to e.g. a gear-type speed change device and resultant further speed-changed power therefrom is divided inside the T/M case 11 into power for front wheel driving and power for rear wheel driving. The front wheel driving power is transmitted to the right and left front wheels 2 via a front-wheel speed changer incorporated in the T/M case 11 and a front-wheel differential device incorporated in the front axle case 18. The rear wheel driving power is transmitted to the right and left rear wheels 3 via e.g. a rear-wheel differential device incorporated in the T/M case 11. Non-speed-changed power obtained from an input shaft of the HST is transmitted via e.g. an implement clutch incorporated in the T/M case 11 to a rear PTO shaft projecting rearward from the rear portion of the T/M case 11 and a mid PTO shaft projecting forward from the front lower portion of the T/M case 11.

Figure 4:
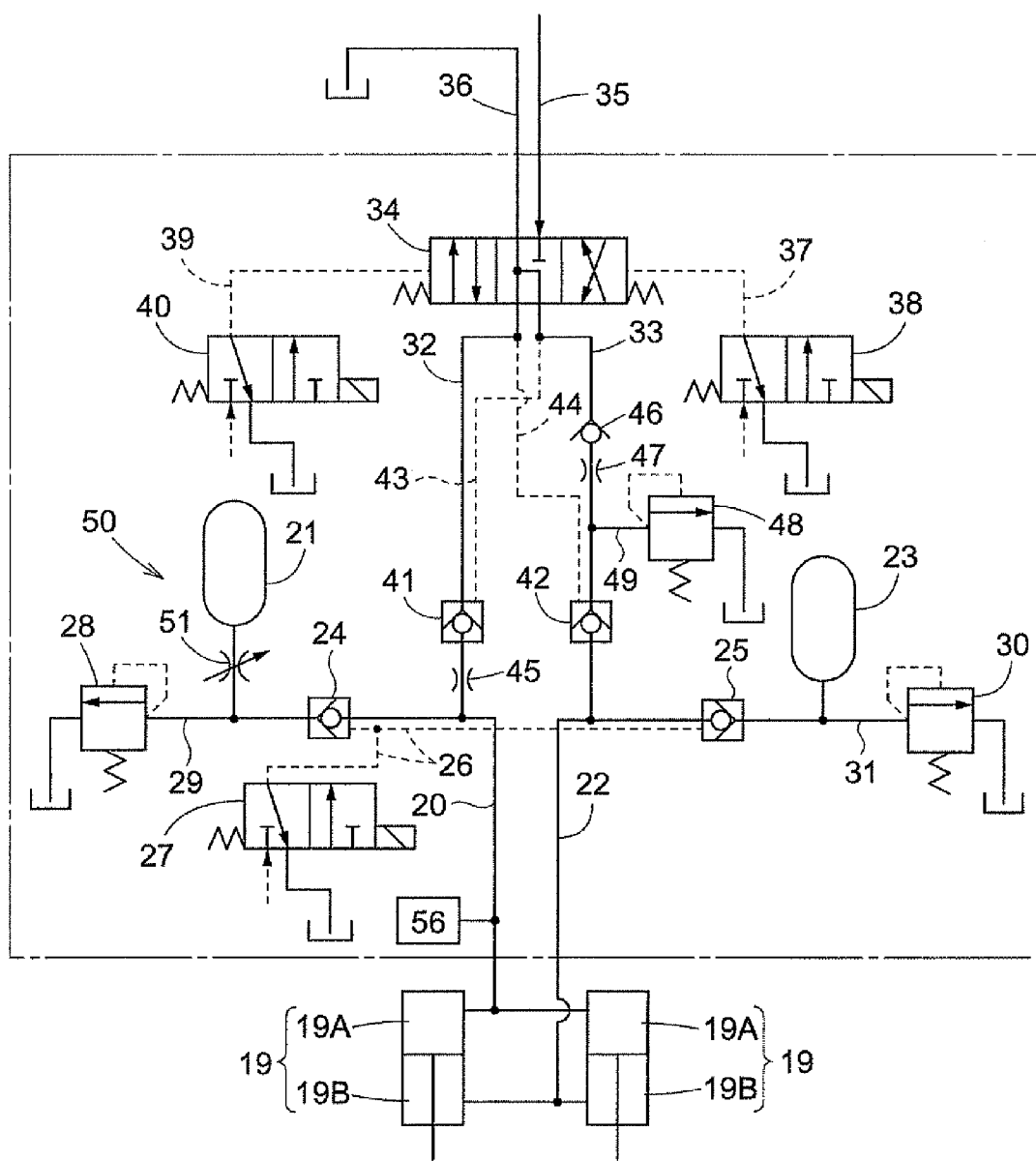
[FIG. 4] a hydraulic oil circuit diagram of a suspension system.

As may be understood from the hydraulic circuit diagram of FIG. 4, each one of the right and left hydraulic cylinders 19 is the double-acting type, and to a head-side oil chamber 19A thereof, there is connected a bladder type first accumulator 21 via a first connecting oil passage 20, and to a rod-side oil chamber of each hydraulic cylinder 19, there is connected a bladder type second accumulator 23 via a second connecting oil passage 22. Within the bladder of each accumulator 21, 23, nitrogen gas acting as a "suspension spring" is charged.

The first connecting oil passage 20 incorporates therein a pilot-operation type first check valve 24 which is opened/closed by a pilot pressure. The second connecting oil passage 22 incorporates therein a pilot-operation type second check valve 25 which is opened/closed by a pilot pressure. Under their closed conditions, these first check valve 24 and second check valve 25 check reverse flow of work oil from the right/left hydraulic cylinders 19 to the corresponding accumulators 21, 23, and allow such reverse flow under their opened conditions To the first check valve 24 and the second check valve 25, an electromagnetic valve 27 is connected through a pilot oil passage 26. This electromagnetic valve 27 can be switched over between a pressure-raising state for raising the pilot pressure to the first check valve 24 and the second check valve 25 and a pressure-lowering state for lowering the pilot pressure to the first check valve 24 and the second check valve 25. In response to a rise in the pilot pressure applied thereto, the first check valve 24 and the second check valve 25 are switched over from the closed condition to the opened condition. In response to a drop in the pilot pressure applied thereto, the valves are switched over from the opened condition to the closed condition. That is to say, these first and second check valves 24, 25 function as check valves in response to a drop in the pilot pressure and stop their function as the check valves in response to a rise in the pilot pressure.

At an oil passage portion in the first connecting oil passage 20 located between the first accumulator 21 and the first check valve 24, there is connected a first drain oil passage 29 having a first safety valve 28. At an oil passage portion in the second connecting oil passage 22 between the second accumulator 23 and the second check valve 25, there is connected a second oil drain passage 31 having a second safety valve 30.

At an oil passage portion in the first connecting oil passage 20 between the right and left hydraulic cylinders 19 and the first check valve 24, there is connected a first supply/drain oil passage 32. At an oil passage portion in the second connecting oil passage 22 between the right and left hydraulic cylinders 19 and the second check valve 25, there is connected a second supply/drain oil passage 33. To these first supply oil passage 32 and second supply oil passage 33, there are connected a supply oil passage 35 and a drain oil passage 36 via a pilot-operation type switching valve 34 which is switched over by a pilot pressure.

The switching valve 34 can be switched over into a first supply/drain state for connecting the first supply oil passage 32 to the supply oil passage 35 and also connecting the second supply/drain oil passage 33 to the drain oil passage 36, a second supply/drain state for connecting the first supply/drain oil passage 32 to the drain oil passage 36 and also connecting the second supply/drain oil passage 33 to the supply oil passage 35, or into a supply/drain stopped state for connecting both the first supply/drain oil passage 32 and the second supply/drain oil passage 33 to the drain oil passage 36. Switching operations of the switching valve 34 are realized by controlling a first electromagnetic valve 38 connected to the switching valve 34 via a first pilot oil passage 37 and a second electromagnetic valve 40 connected to the switching valve 34 via a second pilot oil passage 39.

The first supply/drain oil passage 32 incorporates therein a pilot-operation type third check valve 41 which is opened/closed by a pilot pressure. The second supply/drain oil passage 33 incorporates therein a pilot-operation type fourth check valve 42 which is opened/closed by a pilot pressure. The third check valve 41 and the fourth check valve 44 check, under the closed conditions thereof, reverse flow of the work oil from the corresponding oil passages 20, 22 toward the check valve 34 and allow such reverse flow under their opened conditions.

To the third check valve 41, there is connected via a third pilot oil passage 43, to the switching valve side oil passage portion of the second supply/drain oil passage 33. To the fourth check valve 42, there is connected via a fourth pilot oil passage 44, to the switching valve side oil passage portion of the first supply/drain oil passage 32. With these, if the switching valve 34 is switched over from the supply/drain stopping state to the first supply/drain state, the work oil is supplied toward the fourth check valve 42, whereby the pilot pressure to this fourth check valve 42 is raised. If the switching valve 34 is switched over from the first supply/drain state to the supply/drain stopping state, the work oil is drained from the fourth check valve 42, whereby the pilot pressure to the fourth check valve 42 is lowered. If the switching valve 34 is switched over from the supply/drain stopping state to the second supply/drain state, the work oil is supplied toward the third check valve 41, whereby the pilot pressure to this third check valve 41 is raised. If the switching valve 34 is switched over from the second supply/drain state to the supply/drain stopping state, the work oil is drained from the third check valve 42, whereby the pilot pressure to the third check valve 42 is lowered.

In response to a rise in the pilot pressure applied thereto, the third check valve 41 and the fourth check valve 42 are switched over from the closed condition to the opened condition. In response to a drop in the pilot pressure applied thereto, the valves are switched over from the opened condition to the closed condition. That is to say, these third and fourth check valves 41, 42 function as check valves in response to a drop in the pilot pressure and stop their function as check valves in response to a rise in the pilot pressure.

At an oil passage portion of the first supply/drain oil passage 32 closer to the first connecting oil passage than the third check valve 41, there is incorporated a first throttle valve 45 for speed adjustment. At an oil passage portion of the second supply/drain oil passage 33 closer to the switching valve than the fourth check valve 42, there is incorporated a fifth check valve 46. Between the fourth check valve 42 and the fifth check valve 46, there is incorporated a second throttle valve 47 for speed adjustment. Between the fourth check valve 42 and the second throttle valve 47, there is connected a drain oil passage 49 incorporating a relief valve 48 for maintaining the rod-side pressure in the right and left hydraulic cylinders 19 constant.

With the above-described hydraulic circuit in operation, when the switching valve 34 is under the supply/drain stopping state, the pilot pressures to the third check valve 41 and the fourth check valve 42 are maintained low, whereby the third check valve 41 and the fourth check valve 42 are maintained under the closed conditions, thus functioning as check valves respectively. Under this condition, if the electromagnetic valve 27 is switched over from the pressure lowering state to the pressure raising state, thereby to raise the pilot pressures to the first check valve 24 and the second check valve 25, the first check valve 24 and the second check valve 25 are switched over from the closed conditions to the opened conditions, thus stopping their function as check valves. As a result, the bidirectional flows of work oil between the right and left hydraulic cylinders 19 and the first accumulator 21 and also between the right and left hydraulic cylinders 19 and the second accumulator 23 are allowed, so that nitrogen gas charged inside the bladders of the respective accumulators 21, 23 function as a "suspension spring" and the work oil charged in and between the right and let hydraulic cylinders 19, the first accumulator 21, and the second accumulator 23 functions as a "damper". That is to say, the hydraulic circuit portion 50 consisting of the right and left hydraulic cylinders 19, the first connecting oil passage 20, the first accumulator 21, the second connecting oil passage 22, the second accumulator 23, the first safety valve 28, the second safety valve 30, the third check valve 41, the fourth check valve 42, etc. functions as a hydraulic suspension system.

On the other hand, when the first check valve 24 and the second check valve 25 are maintained under the closed conditions, if the switching valve 34 is switched over from the supply/drain stopping state to the first supply/drain state, the work oil is supplied toward the head-side oil chambers 19A of the right and left hydraulic cylinders 19. Further, as the pilot pressure to the fourth check valve 42 is raised, thereby to switchover this fourth check valve 42 from the closed condition to the opened condition, draining of the work oil via the drain oil passage 49 from the rod-side oil chambers 19B of the right and left hydraulic cylinders 19 is allowed. Whereby, the right and left hydraulic cylinders 19 are extended, to increase the vehicle height on the front side of the tractor.

Thereafter, when the switching valve 34 is switched over from the first supply/drain state to the supply/drain stopping state, the supply of work oil toward the head-side oil chambers 19A of the right and left hydraulic cylinders 19 is stopped. Further, as the pilot pressure to the fourth check valve 42 is dropped thereby to switch over this fourth check valve 42 from the opened condition to the closed condition, the draining of the work oil via the drain oil passage 49 from the rod-side oil chambers 19B in the right and left hydraulic cylinders 19 is prevented. Whereby, the extending operations of the right and left cylinders 19 are stopped, to maintain the vehicle height of the front side of the tractor.

Conversely, if the switching valve 34 is switched over from the supply/drain stopping state to the second supply/drain state, the work oil is supplied toward the rod-side oil chambers 19B of the right and left hydraulic cylinders 19. Further, as the pilot pressure to the third check valve 41 is raised, thereby to switchover this third check valve 41 from the closed condition to the opened condition, draining of the work oil via the drain oil passage 36 from the head-side oil chambers 19A of the right and left hydraulic cylinders 19 is allowed. Whereby, the right and left hydraulic cylinders 19 are contracted, to decrease the vehicle height on the front side of the tractor.

Thereafter, when the switching valve 34 is switched over from the second supply/drain state to the supply/drain stopping state, the supply of work oil toward the rod-side oil chambers 19B of the right and left hydraulic cylinders 19 is stopped. Further, as the pilot pressure to the third check valve 41 is dropped thereby to switch over this third check valve 41 from the opened condition to the closed condition, the draining of the work oil via the drain oil passage 36 from the head-side oil chambers 19A in the right and left hydraulic cylinders 19 is prevented. Whereby, the contracting operations of the right and left cylinders 19 are stopped, to maintain the vehicle height of the front side of the tractor. That is, while the first check valve 24 and the second check valve 25 are maintained under the closed conditions, by controlling the operations of the switching valve 34, the vehicle height on the front side of the tractor can be adjusted.

With the above-described construction, when the weight of the front side of the tractor is increased, thereby to decrease the vehicle height of the front side of the tractor, as a result of attachment of the front loader 12 to this front side of the tractor, the switching valve 34 will be switched over from the supply/drain stopping state to the first supply/drain state, thereby to extend the right and left hydraulic cylinders 19. With this, against the weight of the front loader 12, the vehicle height of the front side of the tractor is increased to the original height position assumed by the same prior to the attachment of the front loader 12. Conversely, when the weight of the front side of the tractor is decreased, thereby to increase the vehicle height of the front side of the tractor, due to detachment of the front loader 12 from this front side of the tractor, the switching valve 34 will be switched over from the supply/drain stopping state to the second supply/drain state, thereby to contract the right and left hydraulic cylinders 19. With this, the vehicle height of the front side of the tractor is decreased to the original height position assumed by the same prior to the detachment of the front loader 12.

Further, when the vehicle height on the front side of the tractor is decreased due to increase in the weight of the front side of the tractor resulting from scooping of earth by the front loader 12, the switching valve 34 will be switched over from the supply/drain stopping state to the first supply/drain state, thereby to extend the right and left hydraulic cylinders 19. As a result, against the weight of the earth, the vehicle height of the front side of the tractor is increased to the original position prior to the earth scooping operation by the front loader 12. Conversely, when the vehicle height on the front side of the tractor is increased due to decrease in the weight of the front side of the tractor resulting from damping of earth from the front loader 12, the switching valve 34 will be switched over from the supply/drain stopping state to the second supply/drain state, thereby to contract the right and left hydraulic cylinders 19. As a result, the vehicle height of the front side of the tractor is decreased to the original position prior to the earth damping operation from the front loader 12.

That is to say, the vehicle height of the front side of the tractor can be maintained at a predetermined level, regardless of any change in the vehicle weight due to attachment/detachment of an implement such as the front loader 12 and/or variation in the load during work.

Incidentally, it is possible to arrange such that this vehicle height adjustment be effected by a vehicle height adjusting controller (not shown) based upon detection by a vehicle height sensor (not shown) for detecting the vehicle height of the front side of the tractor. Further, it is also possible to arrange such that the adjustment be carried by controlling operation by the vehicle height adjusting controller based upon an operation on a manual operational tool (not shown).

Figure 5:
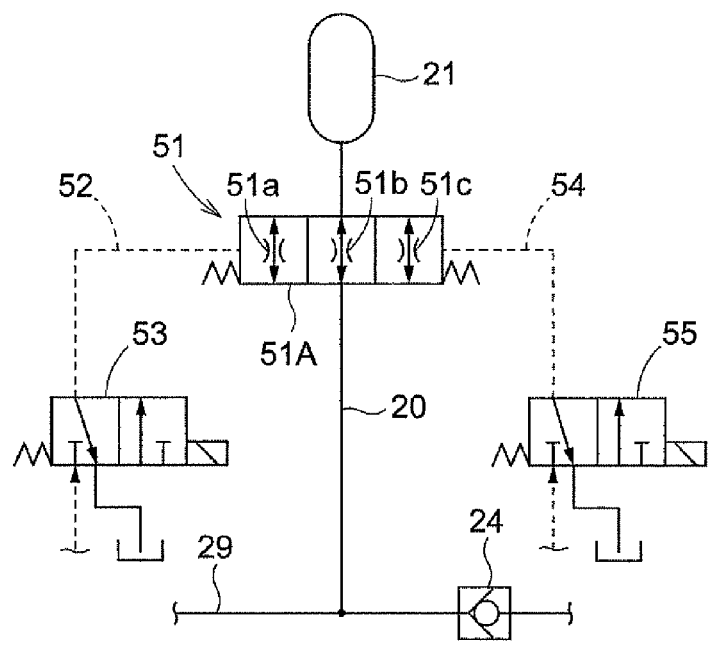
[FIG. 5] a hydraulic circuit diagram showing construction of a flow control valve.

As shown in FIG. 5, at an oil passage portion in the first connecting oil passage 20 between the first accumulator 21 and the first check valve 24, there is incorporated a flow control valve 51 for controlling the amount of work oil flowing between the right and left hydraulic cylinders 19 and the first accumulator 21. The flow control valve 51 is configured as a stepping control type, with its spool 51A having three orifices 51$a$ through 51$c$ of differing flow passage cross section areas and the valve 51 is configured also as a pilot-operation type that the orifice 51$a$ to 51$c$ used is switched over by a pilot pressure. Switchover of each orifice 51$a$-51$c$ of the flow control valve 51 is effected by controlling operations of a first electromagnetic valve 53 attached to the flow control valve 51 via a first pilot oil passage 52, and a second electromagnetic valve 55 attached to the flow control valve 51 via a second pilot oil passage 54.

At an oil passage portion in the first connecting oil passage 20 between the right and left hydraulic cylinders 19 and the first check valve 24, there is provided a pressure sensor 56 operable to detect a head-side cylinder oil passage pressure M (inner pressure of the first connecting oil passage 20) of the hydraulic cylinder 19 of the suspension system, as a sprung load of the suspension system(front load of the tractor). A detection (detected) value of this pressure sensor 56 is inputted to a control unit 57 for damping ratio adjustment, comprised of e.g. a microcomputer, mounted on the tractor.

Figure 6:
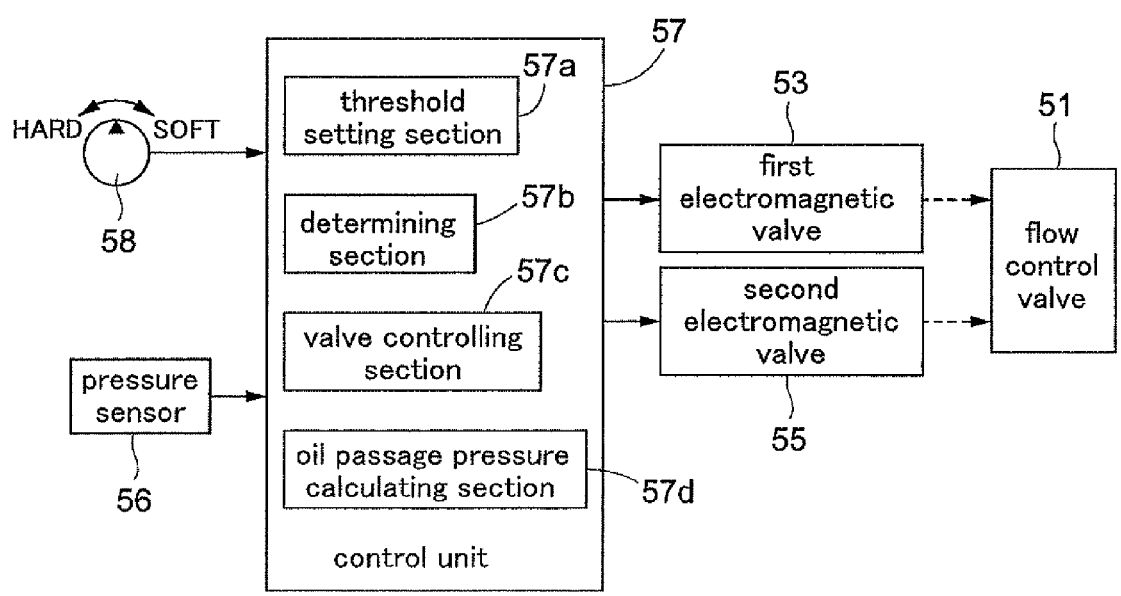
[FIG. 6] a block diagram showing a control construction for damping ratio adjustment.
Figure 7:
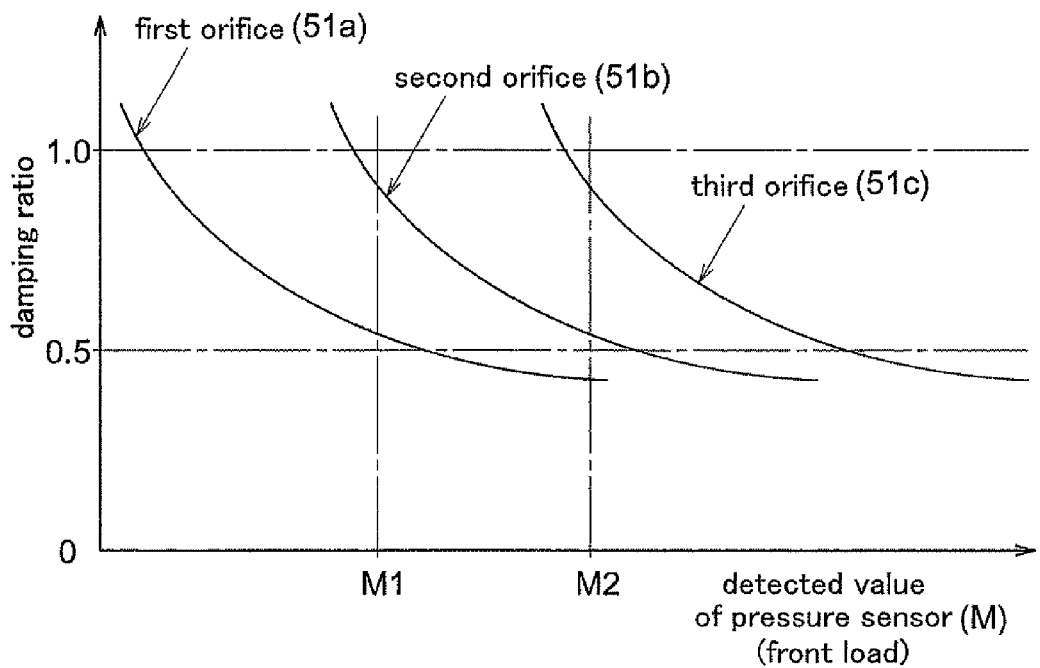
[FIG. 7] a graph showing relationship between front load and damping ratio.

As shown in FIG. 6, the control unit 57 controls the operation of flow control valve 51 so that the damping ratio of the suspension system be confined within an appropriate range (e.g. the range from 0.5 to 1.0), by controlling operations of the first electromagnetic valve 53 and the second electromagnetic valve 55 based on a detection value from the pressure sensor 56 and a first threshold M1 and a second threshold M2 which are set in advance relative to that detection value. To this end, the control unit 57 includes a function executing unit comprised of a threshold setting section 57$a$, a determining section 57$b$, a valve controlling section 57$c$, and a cylinder oil passage pressure calculating section 57$d$. The threshold setting section 57$a$ sets a threshold(s) (a value(s)) for the cylinder oil passage pressure (oil pressure of the first connecting oil passage 20). The determining section 57$b$ determines a first state of the cylinder oil passage pressure being below a set threshold and determines also a second state of the cylinder oil passage pressure being greater than the set threshold. The valve controlling section 57$c$ controls the flow control valve 51 so that in the first state, communication between the hydraulic cylinder 19 and the accumulator 21 be established through an orifice having a large oil passage cross section area and also that in the second state, communication between the hydraulic cylinder 19 and the accumulator 21 be established through an orifice having a small oil passage cross section area. The cylinder oil passage pressure calculating section 57$d$ effects statistical calculation on a plurality of detection values from the pressure sensor 56 inputted within a predetermined period and outputting a reference value obtained therefrom as a cylinder oil passage pressure. In this embodiment, as the reference value, an arithmetic average value is used. However, any other statistically calculated value such as an intermediate value or a median value can be employed instead.

Specifically, the control unit 57 controls the operation of the flow control valve 51 in such a manner that if the head-side cylinder oil passage pressure M of the hydraulic cylinders 19 in the suspension system, as a detection value of the pressure sensor 56, is below the first threshold M1, the communication between the right and left hydraulic cylinders 19 and the first accumulator 21 be established through the first orifice 51$a$ having a large flow passage cross section area configured to correspond to this cylinder oil passage pressure M. Further, the control unit 57 controls the operation of the flow control valve 51 in such a manner that if the head-side cylinder oil passage pressure M of the hydraulic cylinders 19 in the suspension system, as a detection value of the pressure sensor 56, is greater than the first threshold M1 and below the second threshold M2, the communication between the right and left hydraulic cylinders 19 and the first accumulator 21 be established through the second orifice 51b having an intermediate flow passage cross section area configured to correspond to this cylinder oil passage pressure M. The control unit 57 still further controls the operation of the flow control valve 51 in such a manner that if the head-side cylinder oil passage pressure M of the hydraulic cylinders 19 in the suspension system, as a detection value of the pressure sensor 56, is greater than the second threshold M2, the communication between the right and left hydraulic cylinders 19 and the first accumulator 21 be established through the third orifice 51c having a small flow passage cross section area configured to correspond to this cylinder oil passage pressure M.

That is to say, when an implement such as the front loader 12 is attached to the tractor or the front loader 12 scoops up earth during a loader operation by this front loader 12 attached to the tractor, this results in increase in the front load (sprung load of the suspension system) of the tractor and results also in increase in the head-side cylinder oil passage pressure M of the hydraulic cylinders 19 in the suspension system. In association therewith, there occurs increase in the spring constant of the suspension system and relative decrease in the damping ratio of the suspension system, which makes the ratio deviate from the appropriate range. In such case, the control unit 57 switches the orifices 51a-51c of the flow control valve 51 which communicates the right and left hydraulic cylinders 19 with the first accumulator 21, from the one having the large oil passage cross section area to the ones having smaller oil passage cross section areas, thereby to increase the damping ratio, so that the damping ratio of the suspension system may be maintained within the appropriate range.

Conversely, when an implement such as the front loader 12 is detached from the tractor or the front loader 12 damps earth during a loader operation by the front loader 12 attached to the tractor, this results in decrease in the front load (sprung load of the suspension system) of the tractor and results also in decrease in the head-side cylinder oil passage pressure M of the hydraulic cylinders 19 in the suspension system. In association therewith, there occurs decrease in the spring constant of the suspension system and relative increase in the damping ratio of the suspension system, which makes the ratio deviate from the appropriate range. In such case, the control unit 57 switches the orifices 51a-51c of the flow control valve 51 which communicates the right and left hydraulic cylinders 19 with the first accumulator 21, from the one having the small oil passage cross section area to the ones having larger oil passage cross section areas, thereby to decrease the damping ratio, so that the damping ratio of the suspension system may be maintained within the appropriate range.

With the above, it is possible to avoid the inconvenience of the vehicle body keeping vibrating due to reduction in the force needed for damping this vibration, due to too small damping ratio of the suspension system relative to the front load of the tractor. It is also possible to avoid the inconvenience of making the vehicle body too sensitive to shocks due to excess in the force needed for damping the vibration, due to too large damping ratio of the suspension system relative to the front load of the tractor. As a result, it is possible to realize comfortable ride and stable running performance, regardless to attachment/detachment of an implement to/from the tractor or variation in the work load.

When the detection value of the pressure sensor 56 changes from a value below the first threshold M1 to a value greater than the first threshold M1 with the control operation by the control unit 57, the communication between the right and left hydraulic cylinders 19 and the first accumulator 21 is switched over from the state of the communication being established through by the first orifice 51a of the flow control valve 51 to the state of the communication being established through by the second orifice 51b. When the detection value of the pressure sensor 56 changes from a value below the second threshold M2 to a value greater than this second threshold M2 with the control operation by the control unit 57, the communication between the right and left hydraulic cylinders 19 and the first accumulator 21 is switched over from the state of the communication being established through the second orifice 51b of the flow control valve 51 to the state of the communication being established through by the third orifice 51c. Further, when an average value of the detection values of the pressure sensor 56 obtained within a predetermined period changes from a value greater than the second threshold M2 to a value below this second threshold M2, the communication between the right and left hydraulic cylinders 19 and the first accumulator 21 is switched over from the state of the communication being established through the third orifice 51c of the flow control valve 51 to the state of the communication being established through the second orifice 51b. Further, when an average value of the detection values of the pressure sensor 56 obtained within a predetermined period changes from a value greater than the first threshold M1 to a value below this first threshold M1, the communication between the right and left hydraulic cylinders 19 and the first accumulator 21 is switched over from the state of the communication being established through the second orifice 51b of the flow control valve 51 to the state of the communication being established through the first orifice 51a.

That is to say, as the result of attachment of an implement such as the front loader 12 to the tractor or earth scooping operation by the front loader 12 when this is attached to the tractor, as described above, the damping ratio of the suspension system becomes smaller relatively, so that the ratio may deviate from the appropriate range. In this case, by the function of the control unit 57, switchover from the one with the large flow passage cross section area to one with smaller flow passage cross section area of the orifices 51a-51c of the flow control valve 51 for establishing communication between the right and left hydraulic cylinders 19 and the accumulator 21 is effected immediately, whereby the damping ratio of the suspension is increased.

Now, there will be reviewed in details the case of the detection value of the pressure sensor 56 changing from one below the second threshold M2 to one greater than this second threshold M2 due to earth scooping action during a front loader operation by the front loader 12 attached. Suppose immediately after change from the second orifice 51b having the relatively large flow passage cross section area to the third orifice 51c having the small flow passage cross section area, the detection value of the pressure sensor 56 changes from a value greater than the second threshold M2 to a value below the second threshold M2, due to e.g. inadvertent dropping of earth from the front loader 12. In this case too, immediate switchover from the third orifice 51c having the small flow passage cross section area to the second orifice 51b having the relatively large flow passage cross section area upon this detection is avoided advantageously. As a result, it is possible to avoid such inconvenience of the vehicle body keeping vibrated due to reduction in the force needed for damping this vibration. Further, in case there occurs frequent change in the detection value of the pressure sensor 56 across the first threshold M1 or the second threshold M2, the orifices 51a-51c of the flow control valve 51 would be switched over frequently, thus resulting in the inconvenience of too frequent change in the damping ratio of suspension system. The above construction can avoid this convenience also.

As shown in FIG. 6, this tractor includes a manual setter 58 for allowing desired hardness setting of the suspension system. This setter 58 comprises a rotary type potentiometer and outputs its set value to the control unit 57. The higher the hardness of the suspension system the setter 58 sets, the lower the values for the head-side cylinder oil passage pressures in the suspension system the control unit 57 sets as the values of the first threshold M1 and the second threshold M2.

With the above construction, as the setter 58 changes the hardness setting for the suspension system to the harder side, the values of the first threshold M1 and the second threshold M2 for the head-side cylinder oil passage pressure M of the hydraulic cylinders 19 in the suspension system are set to lower values, which makes the orifices 51a-51c of the flow control valve 51 for establishing communication between the right and left hydraulic cylinders 19 and the first accumulator 21 more likely or more easily to be switched from one having a large passage cross section area to one have a small passage cross section area and which also makes the reverse switchover, i.e. from one having a small flow passage cross section area to a large flow passage cross section area less likely or more difficult to occur Conversely, as the setter 58 changes the hardness setting for the suspension system to the softer side, the values of the first threshold M1 and the second threshold M2 for the head-side cylinder oil passage pressure M of the hydraulic cylinders 19 in the suspension are set to higher values, which makes the orifices 51a-51c of the flow control valve 51 for establishing communication between the right and left hydraulic cylinders 19 and the first accumulator 21 less likely to be switched from one having a large passage cross section area to one have a small passage cross section area and which also makes the reverse switchover, i.e. from one having a small flow passage cross section area to a large flow passage cross section area more likely or more easily to occur.

As a result, as the higher the setter 58 sets as the hardness of the suspension system, the more likely one having a small flow passage cross section area for rendering the damping coefficient greater is used as the orifice 51a-51c of the flow control valve 51 for establishing communication between the right and left hydraulic cylinders 19 and the first accumulator 21. This can provide a generally hard riding feel. Conversely, as the softer the setter 58 sets as the hardness of the suspension system, the more likely one having a large flow passage cross section area for rendering the damping coefficient smaller is used as the orifice 51a-51c of the flow control valve 51 for establishing communication between the right and left hydraulic cylinders 19 and the first accumulator 21. This can provide a generally soft riding feel.

Other Embodiments

Figure 8:
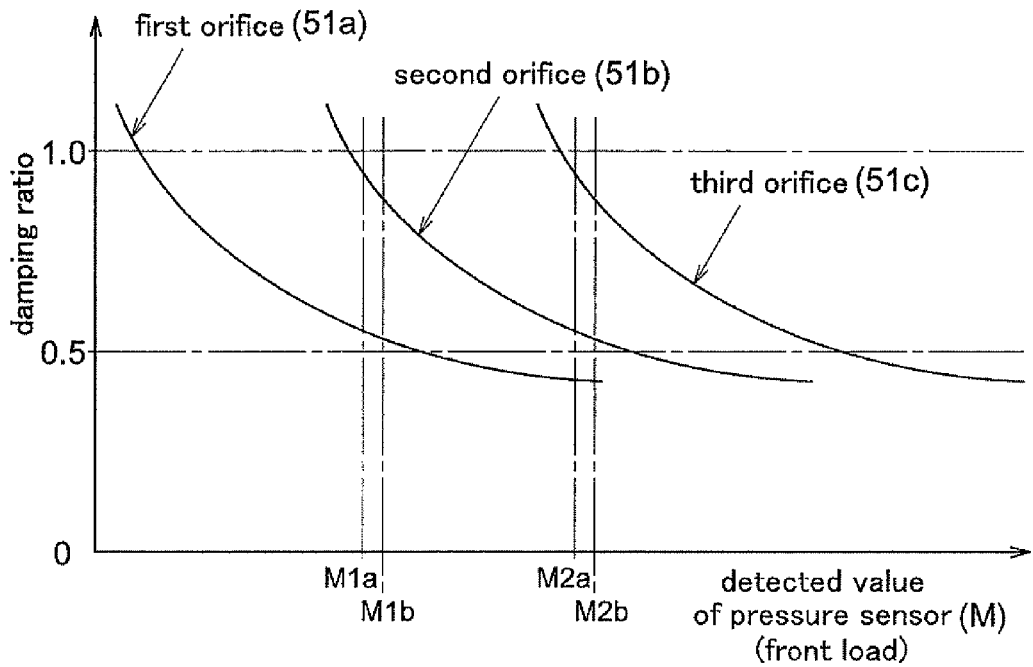
[FIG. 8] a graph showing relationship between front load and damping ratio in a further embodiment.

As the thresholds used for the selection of the respective orifices 51a-51c of the flow control valve 51, a low-level threshold M1a (M2a) and a high-level threshold M1b (M2b) greater than the former can be used. In this case, the high-level threshold M1b (M2b) will be used as the threshold for determining the transition from the first state wherein the hydraulic cylinders and the accumulator are communicated via an orifice having a large flow passage cross section area to a second state wherein the hydraulic cylinders and the accumulator are communicated via an orifice having a small flow passage cross section area. Conversely, the low-level threshold M1a (M2a) will be used as the threshold as the threshold for determining the transition from the second state to the first state, FIG. 8 illustrates the relationship among selection of the respective orifices 51a-51c, the low-level threshold M1a, M2a and the high-level threshold M1b, M2b.

As some non-limiting examples of work vehicle to which the present invention is applicable, a riding managing machine, a riding rice planting machine, a riding mower, a tractor-loader-backhoe (TLB), a tractor-loader-mower (TLM) and a tractor-loader-backhoe-mower (TLBM) can be cited.

As an implement to be mounted on the work vehicle, a rear-mount type rotary tiller or a plow can also be used. Or a mid-mount type mower or the like or a front-mount type fork device can be used also.

The suspension system can alternatively comprise a single hydraulic cylinder 19 or more than three hydraulic cylinders 19.

The suspension system can alternatively be configured such that the accumulators 21, 23 are connected to the hydraulic cylinders 19 for suspending the right and left rear wheels 3 from the vehicle frame 1.

At an oil passage portion in the second connecting oil passage 22 between the second accumulator 23 and the second check valve 25, the flow control valve 51 for controlling the amount of work oil flowing between the rod-side oil chambers 19B of the right and left hydraulic cylinders 19 and the second accumulator 23 can be incorporated, so that the control means (control unit) 57 controls the operation of this flow control valve based upon the detection value(s) of the pressure sensor.

The flow control valve 51 can be an electromagnetic valve.

The flow control valve 51 can be stepped-action type having two or more than four orifices.

The flow control valve 51 can be a stepless action type which controls the flow amount of work oil in a stepless manner.

The setter 58 can be constructed as a stepped-action type which switches the hardness setting for the suspension system in e.g. three steps of "SOFT", "MEDIUM" and "HARD".

The accumulator 21, 23 can be a diaphragm type or piston type.

What is claimed is:

1. A hydraulic suspension system comprising:
    a suspension base supporting wheels;
    a hydraulic cylinder for displaceably suspending said suspension base from a vehicle body;
    an oil passage connected to said hydraulic cylinder;
    an accumulator incorporated within said oil passage;
    a flow control valve incorporated at an oil passage portion between said hydraulic cylinder and said accumulator for controlling an amount of work oil flowing therebetween;
    a pressure sensor for detecting a cylinder oil passage pressure effective on said hydraulic cylinder; and
    a control unit for controlling operation of said flow control valve, based upon a detection value from said pressure sensor; and
    wherein said control unit includes:
        a threshold setting section for setting a threshold for said cylinder oil passage pressure;
        a determining section operable to detect a first state in which said cylinder oil passage pressure is below a set threshold and a second state in which said cylinder oil passage pressure is greater than the set threshold; and valve controlling section operable to control said flow control valve in such a manner that in said first state communication is established between said hydraulic cylinder and said accumulator through an orifice having a large flow passage cross section area, and that in said second state communication is established between said hydraulic cylinder and said accumulator through an orifice having a small flow passage cross section area.

2. A hydraulic suspension system comprising:

a suspension base supporting wheels;

a hydraulic cylinder for displaceably suspending said suspension base from a vehicle body;

an oil passage connected to said hydraulic cylinder;

an accumulator incorporated within said oil passage;

a flow control valve incorporated at an oil passage portion between said hydraulic cylinder and said accumulator for controlling an amount of work oil flowing therebetween;

a pressure sensor for detecting a cylinder oil passage pressure effective on said hydraulic cylinder; and a control unit for controlling operation of said flow control valve, based upon a detection value from said pressure sensor; and wherein said flow control valve comprises a stepped-action type flow control valve having a plurality of orifices with different flow passage cross section areas from each other.

3. The hydraulic suspension system according to claim 1, wherein said threshold setting section has a high-level threshold and a low-level threshold lower than said high-level threshold and sets said high-level threshold as a threshold used in the determination of transition from said first state to said second state and sets said low-level threshold as a threshold used in the determination of transition from said second state to said first state.

4. The hydraulic suspension system according to claim 1, wherein said control unit includes a cylinder oil passage pressure calculating section for calculating a reference value obtained through a statistic calculation such as an averaging calculation, of a plurality of detection values inputted thereto from said pressure sensor within a predetermined period and then outputting said reference value as said cylinder oil passage pressure.

5. The hydraulic suspension system according to claim 1, wherein there is provided a manual setter for suspension setting, and said threshold setting section changes the value of said threshold in accordance with a set value set by said manual setter.

6. A hydraulic suspension system comprising:

a suspension base supporting wheels;

a hydraulic cylinder for displaceably suspending said suspension base from a vehicle body;

an oil passage connected to said hydraulic cylinder;

an accumulator incorporated within said oil passage;

a flow control valve incorporated at an oil passage portion between said hydraulic cylinder and said accumulator for controlling an amount of work oil flowing therebetween;

a pressure sensor for detecting a cylinder oil passage pressure effective on said hydraulic cylinder; and a control unit for controlling operation of said flow control valve, based upon a detection value from said pressure sensor; and wherein said control unit includes:

a threshold setting section for setting first and second thresholds for said cylinder oil passage pressure;

a determining section operable to detect a first state in which said cylinder oil passage pressure is below said first threshold, a second state in which said cylinder oil passage pressure is greater than said first threshold and below said second threshold, and a third state in which said cylinder oil passage pressure is greater than said second threshold; and valve controlling section operable to control said flow control valve in such a manner that in said first state, communication is established between said hydraulic cylinder and said accumulator through an orifice having a large flow passage cross section area and that in said second state, communication is established between said hydraulic cylinder and said accumulator through an orifice having an intermediate flow passage cross section area and that in said third state, communication is established between said hydraulic cylinder and said accumulator through an orifice having a small flow passage cross section area.

7. The hydraulic suspension system according to claim 6, wherein said threshold setting section is capable of setting a high-level threshold and a low-level threshold lower than said high-level threshold, for each one of said first threshold and said second threshold, with setting said high-level threshold as the threshold for determining the transition from the first state to the second state and the transition from the second state to the third state and setting low-level threshold as the threshold for determining the transition from the third state to the second state and the transition from the second state to the first state.

* * * * *